C. KUENTZEL.
STOCK RACK FOR TIRE BUILDING MACHINES.
APPLICATION FILED NOV. 10, 1915.

1,304,492.

Patented May 20, 1919.
2 SHEETS—SHEET 1.

Inventor
Curt Kuentzel
By C.E. Humphrey
Attorney

C. KUENTZEL.
STOCK RACK FOR TIRE BUILDING MACHINES.
APPLICATION FILED NOV. 10, 1915.
1,304,492.
Patented May 20, 1919.
2 SHEETS—SHEET 2.
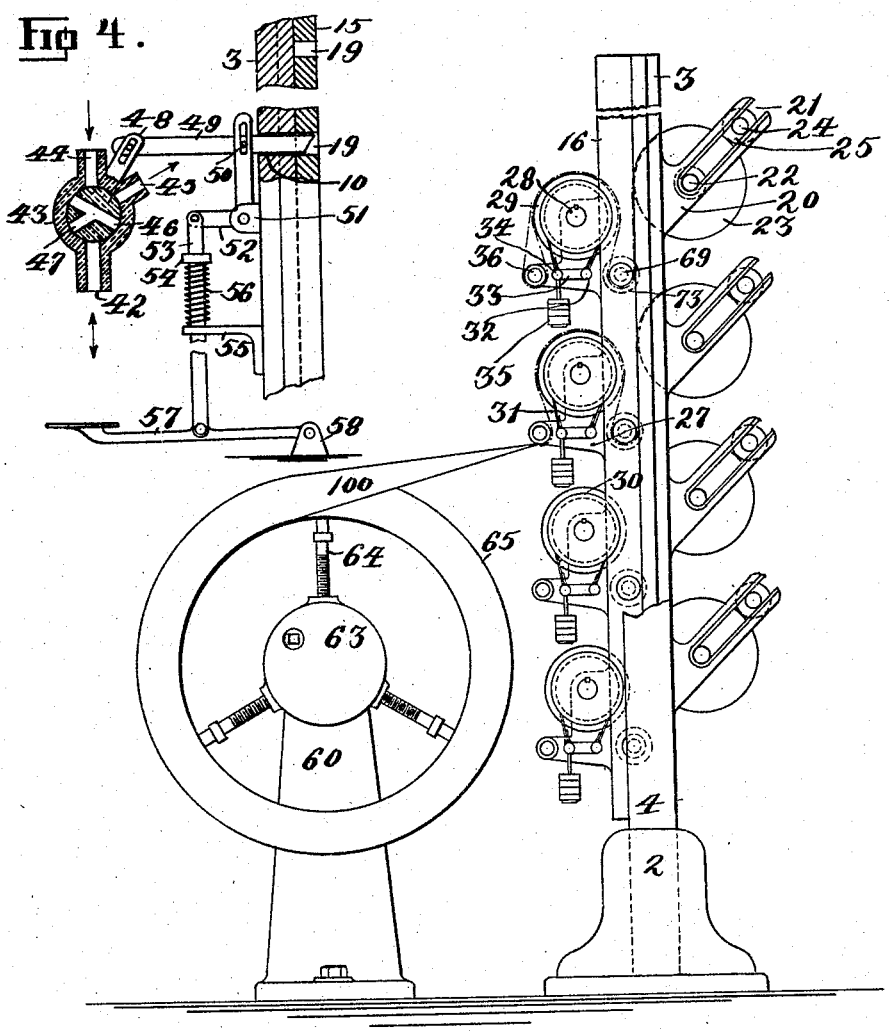
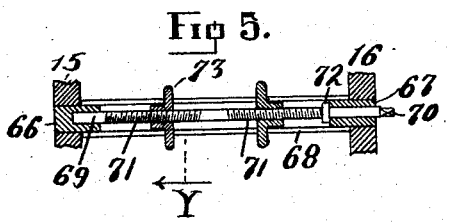
Inventor
CURT KUENTZEL
C. E. Humphrey
By
Attorney

UNITED STATES PATENT OFFICE.

CURT KUENTZEL, OF YOUNGSTOWN, OHIO, ASSIGNOR, BY MESNE ASSIGNMENTS, TO THE GOODYEAR TIRE & RUBBER COMPANY, OF AKRON, OHIO, A CORPORATION OF OHIO.

STOCK-RACK FOR TIRE-BUILDING MACHINES.

1,304,492.  Specification of Letters Patent.  Patented May 20, 1919.

Application filed November 10, 1915. Serial No. 60,684.

*To all whom it may concern:*

Be it known that I, CURT KUENTZEL, a subject of William II, Emperor of Germany, residing at Youngstown, in the county of Mahoning and State of Ohio, have invented new and useful Improvements in Stock-Racks for Tire-Building-Machines, of which the following is a specification.

This invention relates to stock racks for use in connection with tire-building-machines.

Briefly, it is important that in building tires, especially pneumatic tires, that a source of supply of tire-building material be positioned conveniently to the tire-building machine, so as to render the operation of the building of the tire easier and more quickly accomplished. Also it is frequently necessary in the building of pneumatic tires that the threads of one layer of tire-building material must be disposed at an angle with respect to the threads of a coadjacent layer, and hence, the easiest way by which this can be accomplished is to have two stock rollers conveniently placed, one of which carries a winding of fabric with the threads disposed in one direction and a second stock roller with the threads of the fabric or tire-building material disposed at an angle to the threads of the fabric on the first roll.

Therefore, the object of this invention is to provide a simple and compact device for stock rolls conveniently placed and supported for ready use adjacent to a tire-building-machine and so arranged that the fabric from any particular stock roller may be quickly utilized as desired.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1, is a front elevation of a device embodying this invention;

Fig. 3, is a side elevation of the device shown in Fig. 1;

Fig. 4, is a detail partially in section of mechanism employed;

Fig. 5, is a detail in longitudinal section of a guiding roller employed; and,

Fig. 6, is a transverse section of Fig. 5 taken on line Y.

Figure 1:
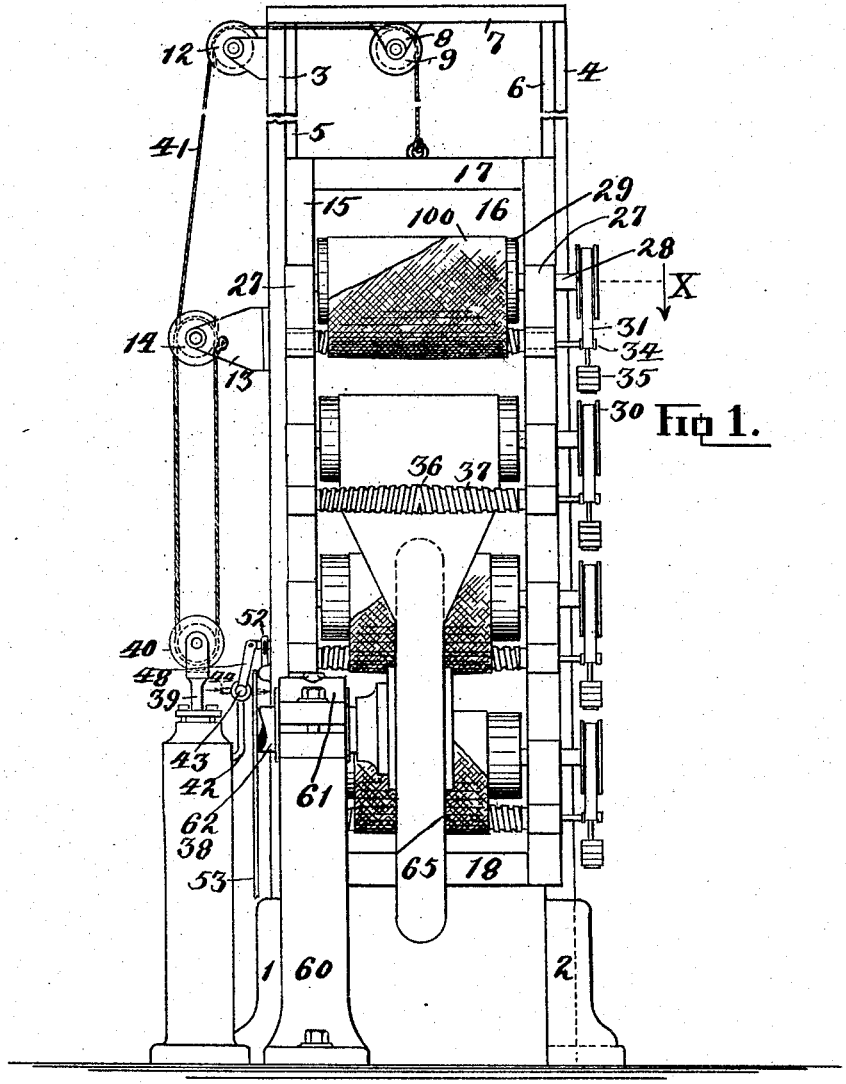
Figure 2:
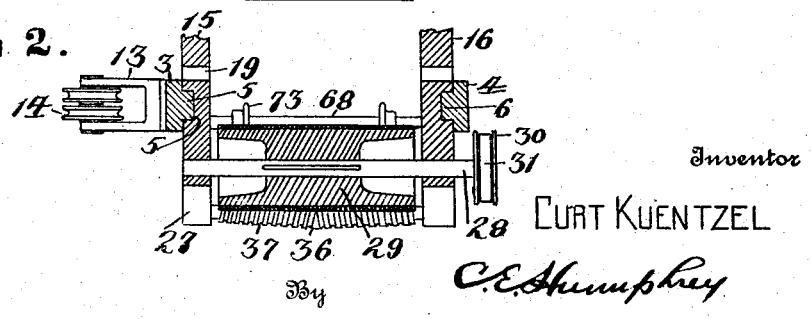
Fig. 2, is a detail in section taken approximately on line X of Fig. 1.

Referring to the drawings in detail, the reference numerals 1 and 2 designate bases suitably mounted on any convenient support, such for instance, as a floor. Extending upwardly from the bases 1 and 2 are a pair of uprights 3 and 4 which are both provided with longitudinal, parallel and inwardly-extending ribs 5 and 6. The upper ends of the members 3 and 4 are connected and held against movement and in parallelism through the medium of a cross-bar 7 on the under face of which is secured a bracket 8 carrying a sheave 9. The upright 3 is provided with a transverse opening 10 (see Fig. 4), and near its upper end with a bracket 11 bearing a sheave 12, below which is a bracket 13 bearing sheaves 14.

The ribs 5 and 6 constitute guiding means for the vertical reciprocation of a carriage which consists of a pair of similar side members 15 and 16 the outer faces of which are provided with longitudinal grooves to receive the ribs 5 and 6. The upper ends of the members 15 and 16 are connected by a cross bar 17 and the lower ends by a cross bar 18 so as to form a hollow rectangular member. The side bar 15 is provided with a series of spaced openings 19 arranged in vertical alinement and adapted when the carriage is moved vertically to be successively brought into transverse registration with the opening 10 in the member 3.

Mounted on the carriage are a plurality of stock rolls and tension devices for tire-building material and as they are all similar, a description of one is believed to be sufficient for the understanding of them all.

On the rear faces of the uprights 15 and 16 are a pair of rearwardly-extending, upwardly-inclined slotted brackets 20. The slots 21 constitute bearings for the end spindles 22 of a stock-roll 23 on which is mounted wrappings of tire-building material 100 alternating with some separating material such as muslin for preventing the various layers of sticky tire-building material from adhering together. The slots 21 also constitute bearings to receive the spindle ends 24 of a take-up roller 25 onto which the strip of muslin winds as the tire-building material is unwound from the roll 23.

Positioned below the stock roll 23 in suitable openings in the uprights 15 and 16 and in horizontal alinement with each other is a pair of journals 66 and 67 (see Figs. 5 and 6). These journals 66 and 67 project inwardly toward each other beyond the inner faces of the members 15 and 16 and constitute supports for a pair of rods 68 arcuate in cross-section and extending between the members 15 and 16 and slightly spaced apart. Mounted in suitable openings in the journals 66 and 67 is a shaft 69 one end 70 of which is squared to receive a wrench and the portions of the shaft between the bearings 66 and 67 are provided with reverse threads 71. A collar 72 holds the shaft from transverse movement. Mounted on the shaft 69 are a pair of guiding members 73 each interiorly and reversely threaded with respect to one another so that by the rotation of the shaft 69 they will be drawn toward or away from each other. These guides 73 are provided with apertures to receive arcuate rods 68 slidable thereon and are held from independent rotation thereby.

Secured to the front faces of the uprights 15 and 16 are L-shaped brackets 27 in each of which is revolubly mounted a shaft 28 bearing a tension roll 29 which consists of an ordinary pulley or roll preferably covered with a layer of some friction-producing substance, such as rubber. The outer end of the shaft 28 bears a flanged pulley 30 about which extends a brake-band 31 one end of which is anchored to a pin 32 on one bracket 27. This pin 32 also bears a rocking-arm 33, on the outer end of which is a pin 34 loosely connected with the opposite end of the brake-band 31. Pivotally secured to the pin 34 is a counterweight 35. Revolubly mounted in the projecting ends of the brackets 27 is a smoothing roller 36 having a greater diameter at its transverse median portion than at its ends and with its outer surface tapered in both directions and provided with reversely-arranged helical grooves 37.

Positioned adjacent to the device is a cylinder 38 provided with a reciprocating piston (not shown) adapted to be operated by any suitable fluid. The piston bears a piston-rod 39 on the upper end of which is revolubly mounted a plurality of sheaves 40. Extending from a suitable anchorage on the bracket 13 around the sheaves 40 and 14 and from thence upwardly over the sheaves 12 and 9 is a flexible member such, for instance, as a cord or cable 41.

Communicating with the upper portion of the cylinder 38 above the piston is a duct 42 the upper end of which is connected with a valve casing 43 (see Fig. 4) provided with an inlet port 44 and an exhaust port 45. Within the valve casing 43 is a three-way valve having a transverse opening 46 and a connecting branch outlet 47. The valve is operated by an arm 48 to which is pivotally connected a locking arm 49 bearing a pin 50. The locking arm 49 is slidably mounted in the opening 10 in the standard 3. Pivotally secured to the standard 3 on a bracket 51 is a bell-crank lever 52 provided at its upper end with a slot for receiving the pin 50 and at the other end pivotally connected with a rod 53 bearing a collar 54. The rod 53 passes through a guide 55 and between the guide 55 and the collar 54 is a coiled spring 56 the normal tendency of which is to raise the rod 53 and thereby shift the locking arm inwardly or to the right in Fig. 4. The lower end of the rod 53 is pivotally connected with a suitably placed foot-lever 57 fulcrumed at 58. Positioned in front of and in substantial alinement with the upright 3 is a housing 60 provided at its upper end with a journal-box 61 to receive a horizontal shaft 62 which bears a chuck 63 of ordinary construction provided with three radially-extending arms 64 adapted to temporarily hold a tire-building core 65. The core 65 is positioned centrally and in front of the side members 15 and 16 of the carriage.

The operation of the device is as follows: In order to lower the carriage, the foot-lever 57 is partially depressed which withdraws the locking arm 49 from the respective opening 19 which is in registration with the opening 10 in the upright 3, and this movement of the locking arm 49 rotates the valve so as to bring the port 46 therein in alinement with the outlet 45 and the branch port 47 in alinement with the duct 42 which permits the escape of the fluid about the piston outwardly through the exhaust 45. This release of the fluid permits the carriage to descend due to gravity until it has reached a predetermined point which is ascertained by the registration of any one of the openings 19 with the opening 10, then the pressure upon the foot-lever is removed and the carriage is locked in position. When it is desired to raise the carriage, the foot-lever 57 is forced completely down, which also removes the arm 49 from the opening 19 and brings the port 46 in the valve into registration with the inlet 44 and duct 42, allowing fluid to enter the cylinder, thereby depressing the piston and hence, raising the carriage through the medium of the flexible member 41.

Having raised the stock-roll to an appropriate position and locked it, a strip of tire-building material 100 is unwound from an appropriate stock-roll and carried downwardly and between the guides 73 and from thence over the tension roll 29 and around the straightening and wrinkle-removing member 36, and is carried to and applied on the core 65. The tension on the tension-roller is regulated by the counterweight 35 and all wrinkles are removed by the straightening roller 36 in the ordinary way.

After the placement of the initial layer on the core, the position of the carriage may be varied so as to bring another stock-roll into juxtaposition with respect to the core and a layer of the tire-building material taken from the second stock-roll and applied to the core or it may be taken from any other stock-roll on the carriage, the arrangement of the various layers on the various stock-rolls being matter which will be pre-determined by the user of the device.

I claim:—

1. A stock-rack comprising a carriage; an instrumentality for moving the carriage; means for locking the carriage in predetermined positions; and a connection between the locking and moving means whereby the unlocking of the carriage effects actuation of the carriage-moving instrumentality.

2. A stock-rack comprising a carriage; an instrumentality for moving the carriage; means for locking the carriage in a plurality of positions; and automatic means for actuating the locking means when the carriage has arrived at a predetermined position.

3. A stock-rack comprising a carriage; an instrumentality for moving the carriage; means for locking the carriage in a plurality of positions; automatic means for actuating the locking means when the carriage has arrived at a predetermined position; and means for automatically cutting off actuation of the carriage-moving instrumentality upon actuation of the locking means.

4. A stock-rack comprising a carriage; a series of fabric-carrying rolls mounted on the carriage and movable thereby into different horizontal planes; an instrumentality for moving the carriage and the rolls which it carries; means for locking the carriage and, thus, the rolls in predetermined positions; and a connection between the locking and moving means whereby the unlocking of the carriage effects actuation of the carriage-moving instrumentality.

5. A stock-rack comprising a carriage; an instrumentality for moving the carriage; means for locking the carriage in a plurality of positions; and a connection between the carriage-moving instrumentality and locking means whereby actuation of the locking means for a predetermined period will effect movement of the carriage in one direction and operation of the locking means further will effect a reversal of movement of the carriage.

6. A stock-rack comprising a carriage; an instrumentality for moving the carriage; means for locking the carriage in a plurality of positions; a connection between the carriage-moving instrumentality and locking means whereby actuation of the locking means for a predetermined period will effect movement of the carriage in one direction and operation of the locking means further will effect a reversal of movement of the carriage; and automatic means for actuating the locking means when the carriage has moved a predetermined distance.

7. A stock-rack comprising guides; a carriage provided with an opening therein, mounted for movement in said guides; a locking-member adapted to be pressed into said opening to lock the carriage to the guide; a pressure-operating device for moving the carriage; a valve controlling the admission of pressure to said device; and a connection between the valve and locking member whereby they are operable in synchronism.

8. A stock-rack comprising guides; a carriage provided with an opening therein, mounted for movement in said guides; a locking-member adapted to be pressed into said opening to lock the carriage to the guide; a pressure-operating device for moving the carriage; a valve controlling the admission of pressure to said device; and means normally to hold the locking member within the opening in the carriage.

9. A stock-rack comprising guides; a carriage movably mounted therein; a pressure-fluid carriage-actuating mechanism connected with said carriage; a valve controlling admission of pressure-fluid to and exhaust from said mechanism; a locking member disposed in the path of said carriage; said carriage being provided with spaced-apart openings for the reception of said locking member; a lever mechanism connected with said locking member to withdraw it from said openings; and a spring tending normally to force the locking member into one of said openings.

10. A stock-rack comprising guides; a carriage movably mounted therein; a pressure-fluid carriage-actuating mechanism connected with said carriage; a valve controlling admission of pressure-fluid to and exhaust from said mechanism; a locking member disposed in the path of said carriage; said carriage being provided with spaced-apart openings for the reception of said locking member; a lever mechanism connected with said locking member to withdraw it from said openings; and mechanism connecting said valve and said locking member whereby withdrawal of the locking member from one of the openings in the carriage will effect communication between the pressure-fluid mechanism and the exhaust to permit movement of the carriage in one direction.

11. A stock-rack comprising guides; a carriage movably mounted therein; a pressure-fluid carriage-actuating mechanism connected with said carriage; a valve controlling admission of pressure-fluid to and exhaust from said mechanism; a locking member disposed in the path of said carriage; said carriage being provided with spaced-apart openings for the reception of said locking member; a lever mechanism connected with said locking member to withdraw it from said openings; and mechanism connecting said valve and said locking member whereby withdrawal of the locking member from one of the openings in the carriage will effect communication between the pressure-fluid mechanism and the exhaust to permit movement of the carriage in one direction, and a further movement of the locking member in the same direction will effect communication between the pressure mechanism and the valve-inlet to move the carriage in the opposite direction.

12. A stock-rack comprising guides; a carriage movably mounted therein; a pressure-fluid carriage-actuating mechanism connected with said carriage; a valve controlling admission of pressure-fluid to and exhaust from said mechanism; a locking member disposed in the path of said carriage; said carriage being provided with spaced-apart openings for the reception of said locking member; a lever mechanism connected with said locking member to withdraw it from said openings; mechanism connecting said valve and said locking member whereby withdrawal of the locking member from one of the openings in the carriage will effect communication between the pressure-fluid mechanism and the exhaust to permit movement of the carriage in one direction; and means for automatically closing the valve when the locking member is in alinement with an opening in the carriage.

13. A stock-rack comprising guides, one of which is provided with an opening; a carriage mounted in said guides and provided with spaced-apart openings adapted to register with the opening in the guide; a locking member disposed in the opening in the guide; a pressure-operated mechanism connected with the carriage to move the same; a valve having an inlet and exhaust port communicating with said pressure-operated mechanism; a connection between the locking-member and the valve; and a lever connected with the locking-member whereby actuation of the lever in one direction will withdraw the locking member and actuate the pressure-operated mechanism to move the carriage.

14. A stock-rack comprising guides, one of which is provided with an opening; a carriage mounted in said guides and provided with spaced-apart openings adapted to register with the opening in the guide; a locking-member disposed in the opening in the guide; a pressure-operated mechanism connected with the carriage to move the same; a valve having an inlet and exhaust port communicating with said pressure-operated mechanism; a connection between the locking-member and the valve; a lever connected with the locking-member whereby actuation of the lever in one direction will withdraw the locking member and actuate the pressure-operated mechanism to move the carriage; and means for automatically actuating the lever in the other direction to effect a locking between the carriage and the guides and cut off actuation of the carriage-operating mechanism.

In testimony whereof I have hereunto set my hand.

CURT KUENTZEL.

Copies of this patent may be obtained for five cents each, by addressing the "Commissioner of Patents, Washington, D. C."